(12) United States Patent
Umeki et al.

(10) Patent No.: US 11,320,443 B2
(45) Date of Patent: May 3, 2022

(54) AUTOMATIC ANALYSIS DEVICE

(71) Applicant: Hitachi High-Technologies Corporation, Tokyo (JP)

(72) Inventors: Hiroya Umeki, Tokyo (JP); Kenta Imai, Tokyo (JP); Yoshihiro Yamashita, Tokyo (JP); Shunsuke Sasaki, Tokyo (JP); Akihiro Endou, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 285 days.

(21) Appl. No.: 16/477,221

(22) PCT Filed: Feb. 15, 2018

(86) PCT No.: PCT/JP2018/005241
§ 371 (c)(1),
(2) Date: Jul. 11, 2019

(87) PCT Pub. No.: WO2018/163744
PCT Pub. Date: Sep. 13, 2018

(65) Prior Publication Data
US 2020/0249249 A1 Aug. 6, 2020

(30) Foreign Application Priority Data
Mar. 10, 2017 (JP) .............................. JP2017-045602

(51) Int. Cl.
*G01N 35/00* (2006.01)
*G01N 35/10* (2006.01)

(52) U.S. Cl.
CPC ... *G01N 35/00712* (2013.01); *G01N 35/1002* (2013.01); *G01N 2035/106* (2013.01)

(58) Field of Classification Search
None
See application file for complete search history.

(56) References Cited

U.S. PATENT DOCUMENTS

| 5,488,854 A | 2/1996 | Kawanabe et al. |
| 5,723,795 A | 3/1998 | Merriam |
| (Continued) | | |

FOREIGN PATENT DOCUMENTS

| EP | 1 391 734 A2 | 2/2004 |
| JP | 05-249124 A | 9/1993 |
| (Continued) | | |

OTHER PUBLICATIONS

Machine-generated English translation for JP 10-227799 (Kawanabe) (Year: 1998).*

(Continued)

*Primary Examiner* — Kathryn Wright
(74) *Attorney, Agent, or Firm* — Mattingly & Malur, PC

(57) ABSTRACT

An automatic analysis device includes a probe that performs a dispensing operation including a suction process and a discharge process with respect to liquid; a syringe that generates a pressure change for dispensing liquid at the probe; a flow path that connects the probe and the syringe with each other; a pressure sensor that measures the pressure change in the flow path at the time of liquid dispensing; a storage portion that stores a pressure change of time-series when reference fluid is discharged as a reference discharge pressure waveform; and a determination portion that determines whether or not there is an abnormality in the suction process of the sample from a relationship between a value of difference or a ratio between the reference discharge pressure waveform and the pressure waveform of a determination target at the time of discharge of liquid and normal range.

6 Claims, 12 Drawing Sheets

(56) References Cited

U.S. PATENT DOCUMENTS

| | | | |
|---|---|---|---|
| 2004/0034479 A1* | 2/2004 | Shimase | G01N 35/1016 702/19 |
| 2007/0025882 A1* | 2/2007 | Zuppiger | B01L 3/021 422/400 |
| 2009/0070049 A1* | 3/2009 | Ziegler | G01N 35/1016 702/50 |
| 2009/0117010 A1* | 5/2009 | Bjorson | G01F 23/185 422/400 |
| 2010/0327012 A1* | 12/2010 | Saegusa | G01N 35/1016 73/863 |
| 2011/0267198 A1* | 11/2011 | Ohga | G01N 35/1016 340/626 |
| 2014/0220693 A1 | 8/2014 | Yamazaki et al. | |
| 2015/0219680 A1 | 8/2015 | Mimura et al. | |
| 2015/0362514 A1* | 12/2015 | Tamezane | G01N 35/00623 422/509 |
| 2016/0003860 A1* | 1/2016 | Wang | G01L 9/00 222/1 |
| 2018/0031589 A1 | 2/2018 | Tamezane et al. | |

FOREIGN PATENT DOCUMENTS

| | | | | |
|---|---|---|---|---|
| JP | 10227799 A | * | 8/1998 | ............. G01N 35/10 |
| JP | 11-501399 A | | 2/1999 | |
| JP | 11-258244 A | | 9/1999 | |
| JP | 2005-227102 A | | 8/2005 | |
| JP | 2014-44174 A | | 3/2014 | |
| WO | 2013/031416 A | | 3/2013 | |
| WO | 2016/136438 A1 | | 9/2016 | |
| WO | WO-2016136438 A1 | * | 9/2016 | ....... G01N 35/00722 |

OTHER PUBLICATIONS

Notice of Reasons for Refusal, dated Aug. 11, 2020, issued in corresponding Japanese Patent Application No. 2019-504416.
Extended European Search Report received in corresponding European Application No. 18764759.9 dated Dec. 1, 2020.
International Search Report of PCT/JP2018/005241 dated May 1, 2018.

* cited by examiner

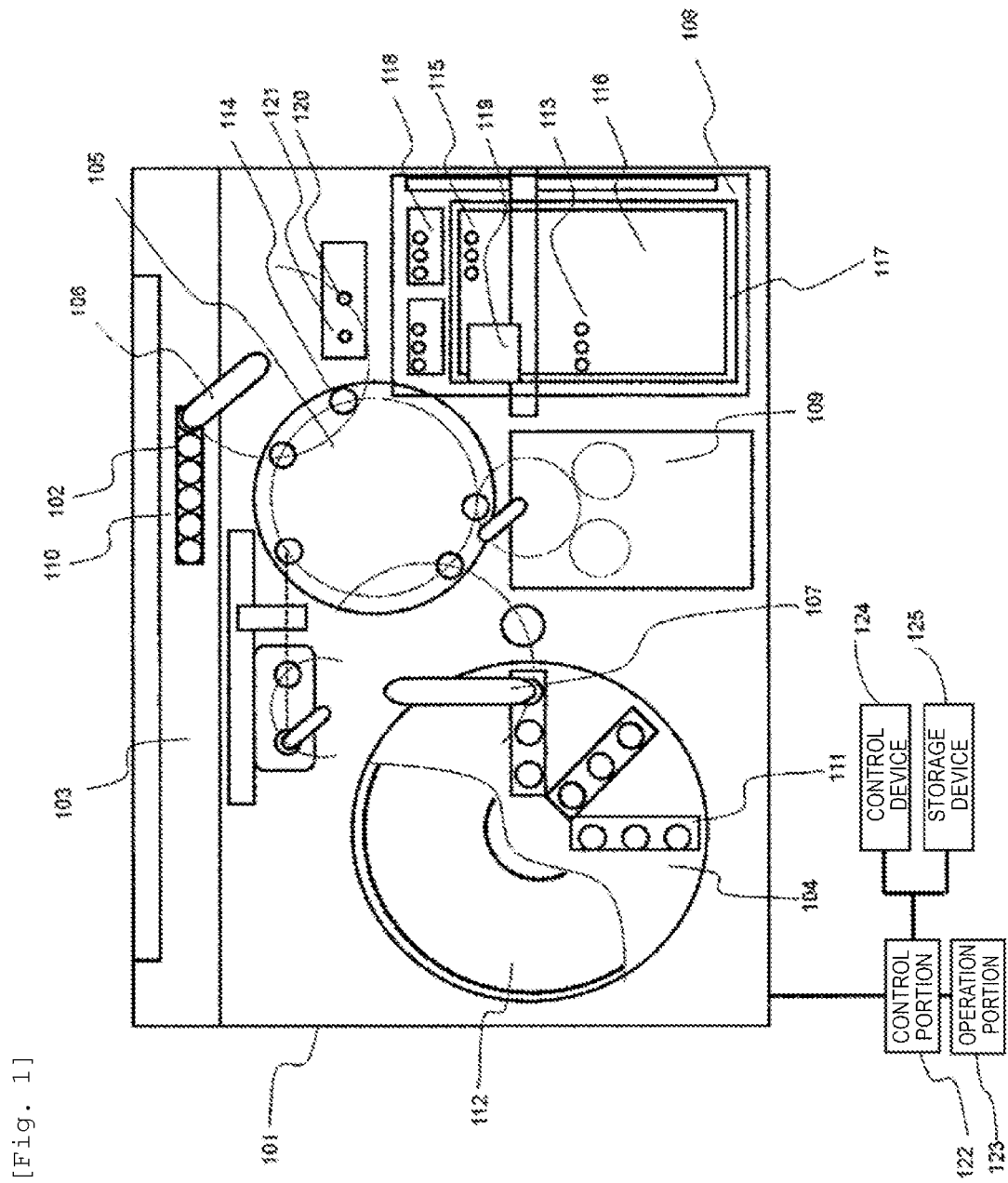
[Fig. 1]

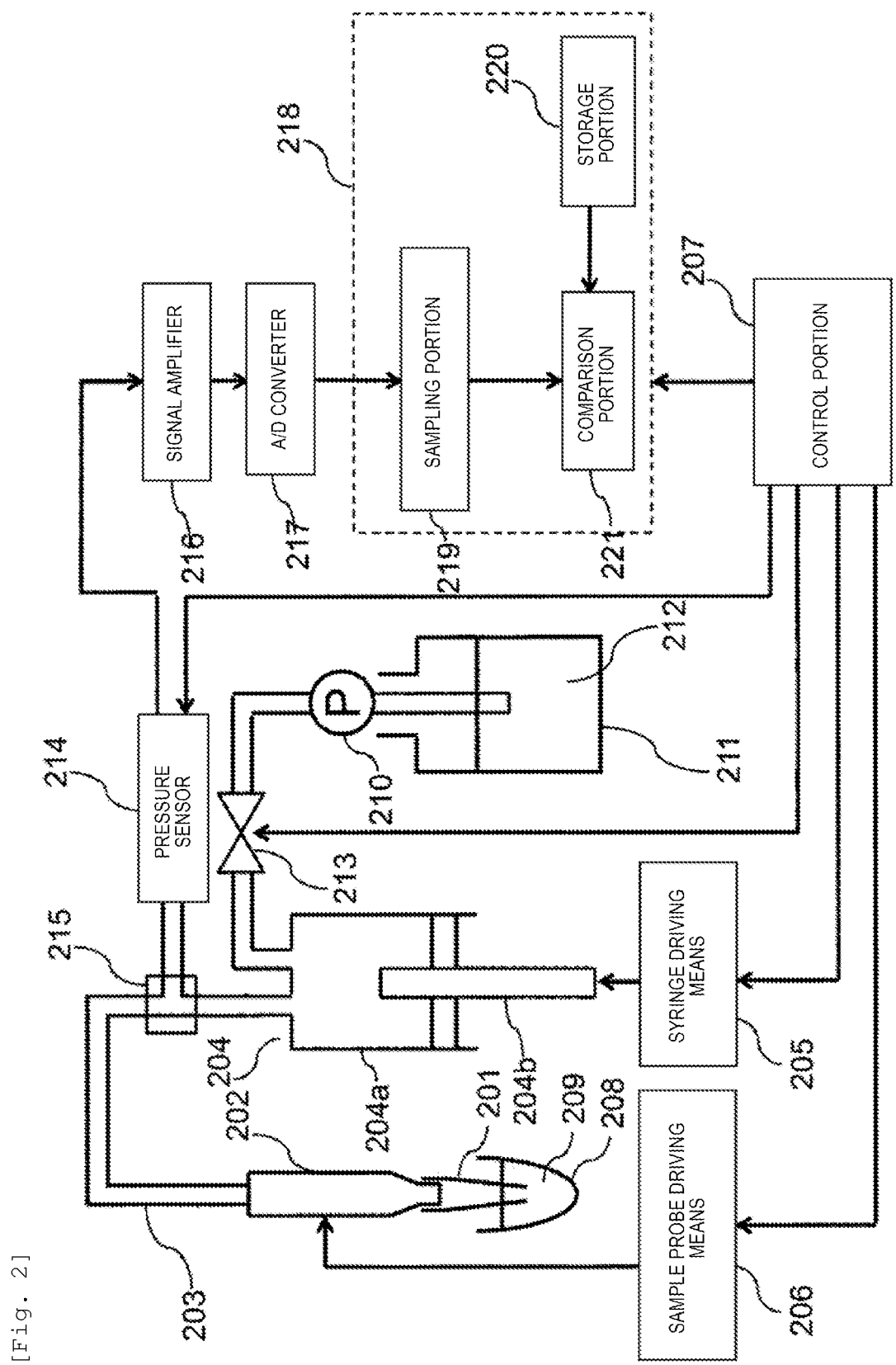
[Fig. 2]

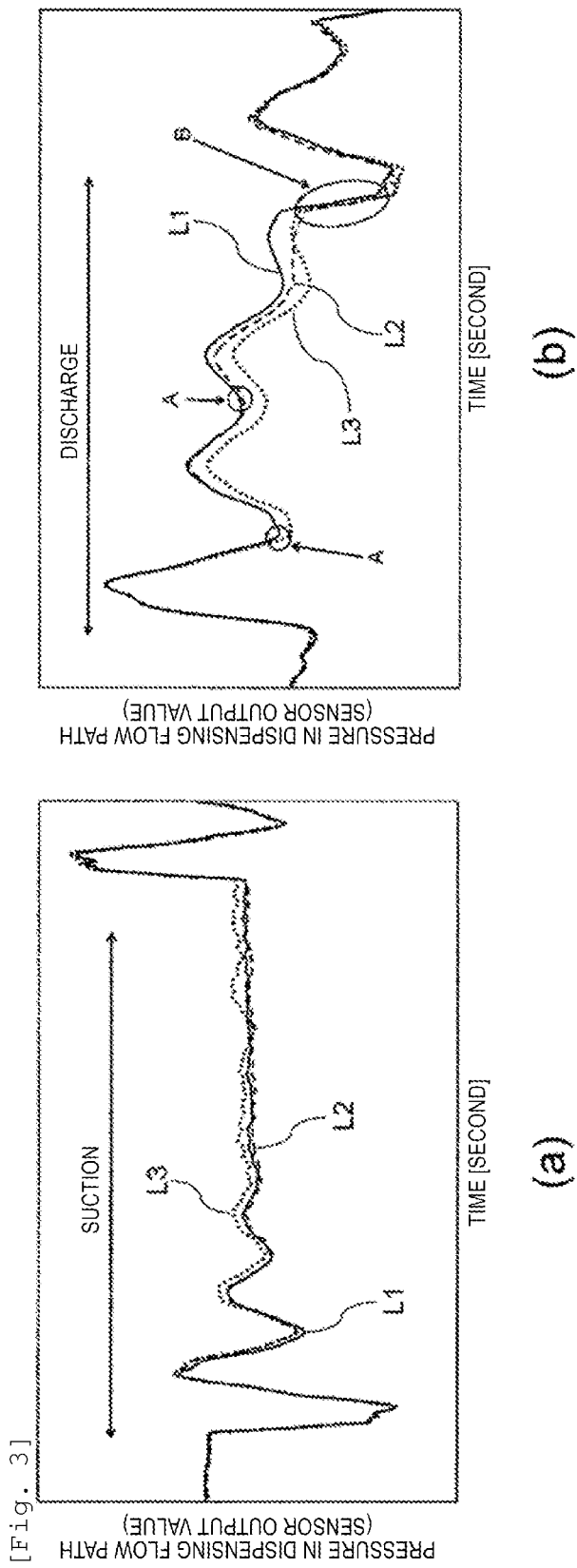

[Fig. 4]
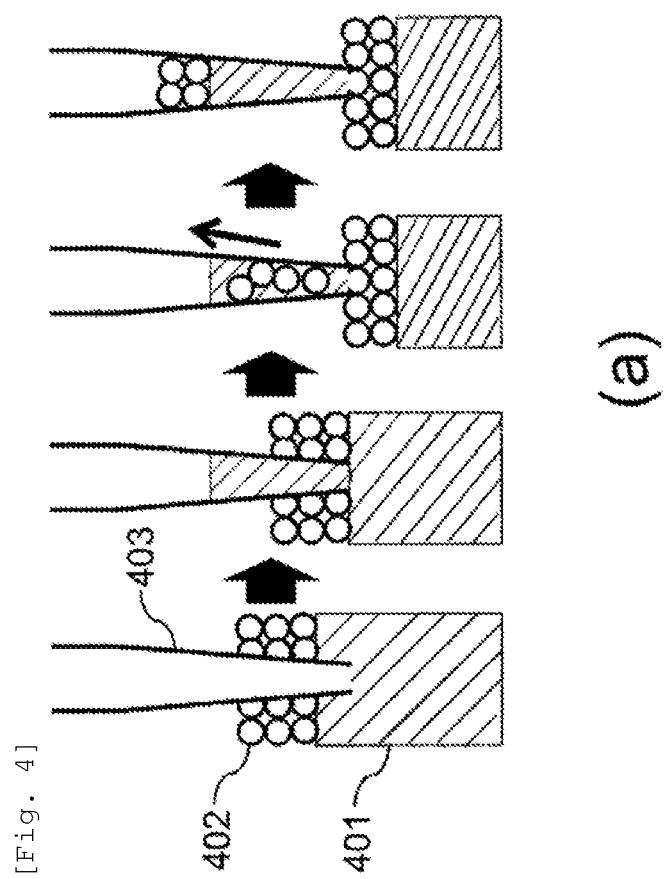
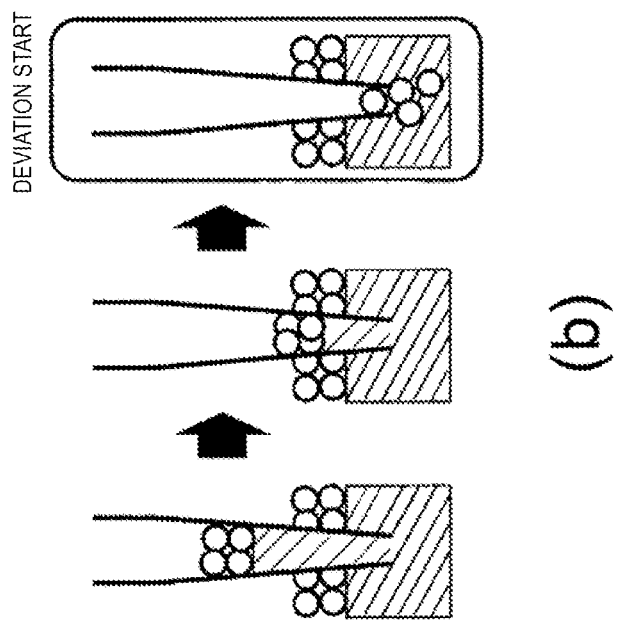

[Fig. 5]
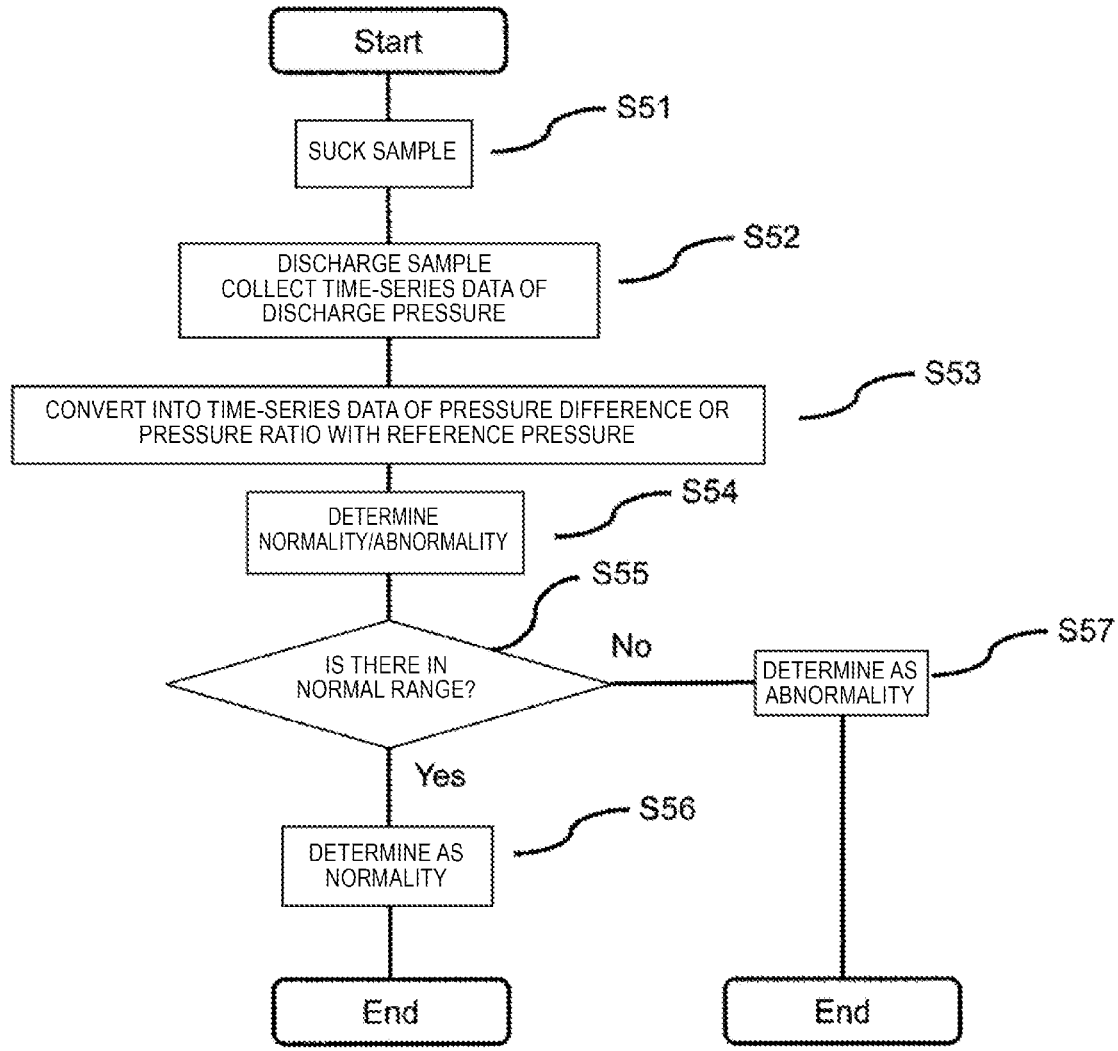

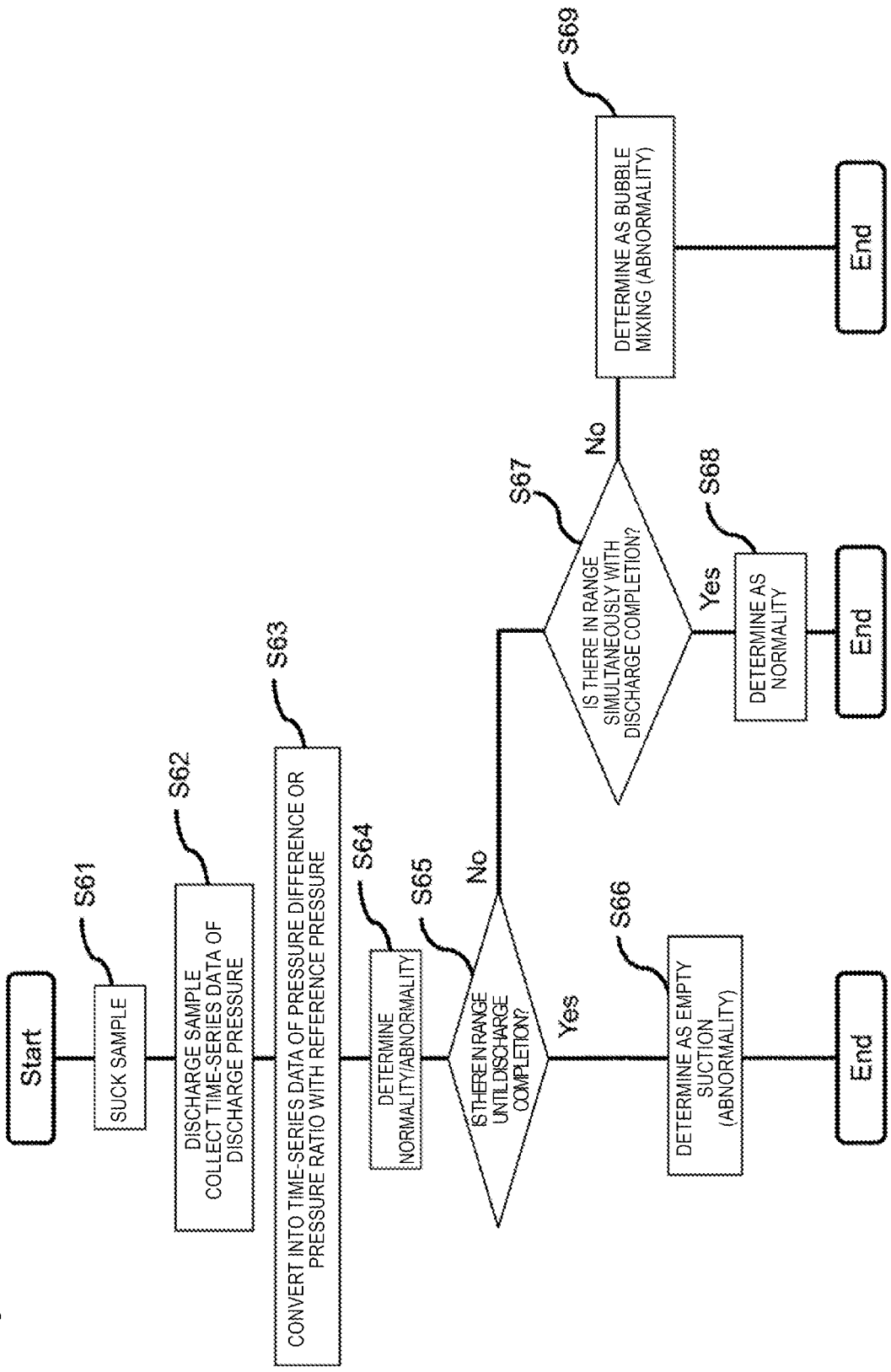

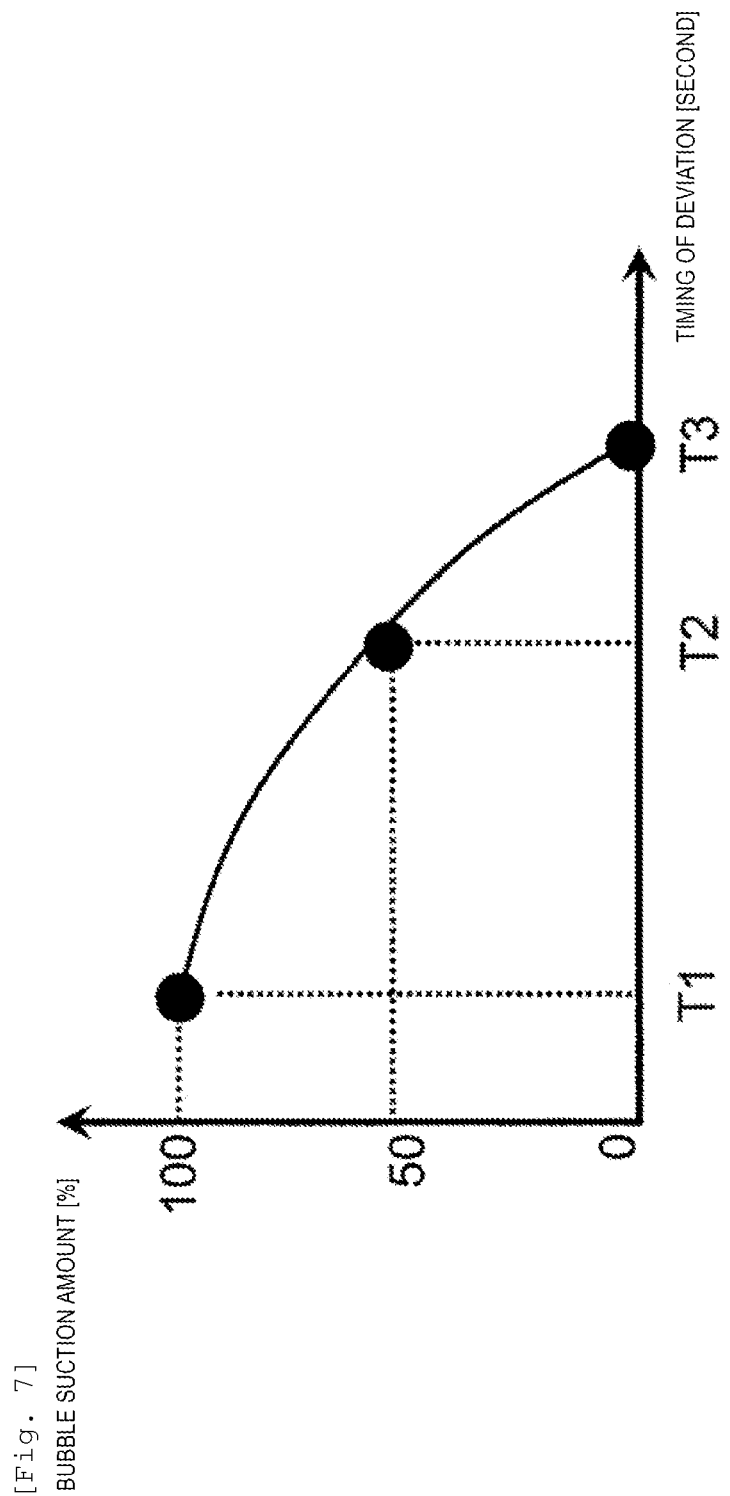

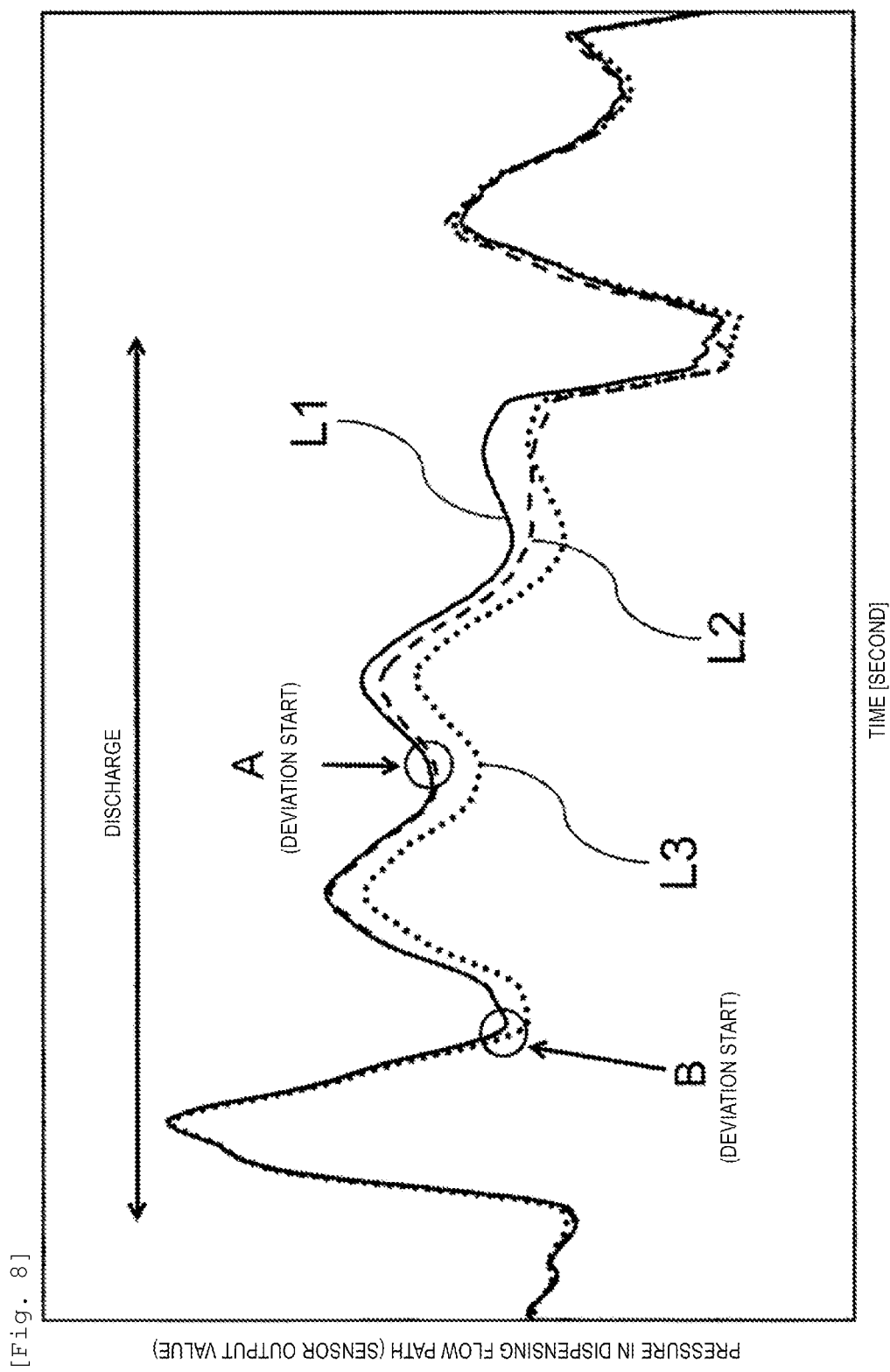
[Fig. 8]

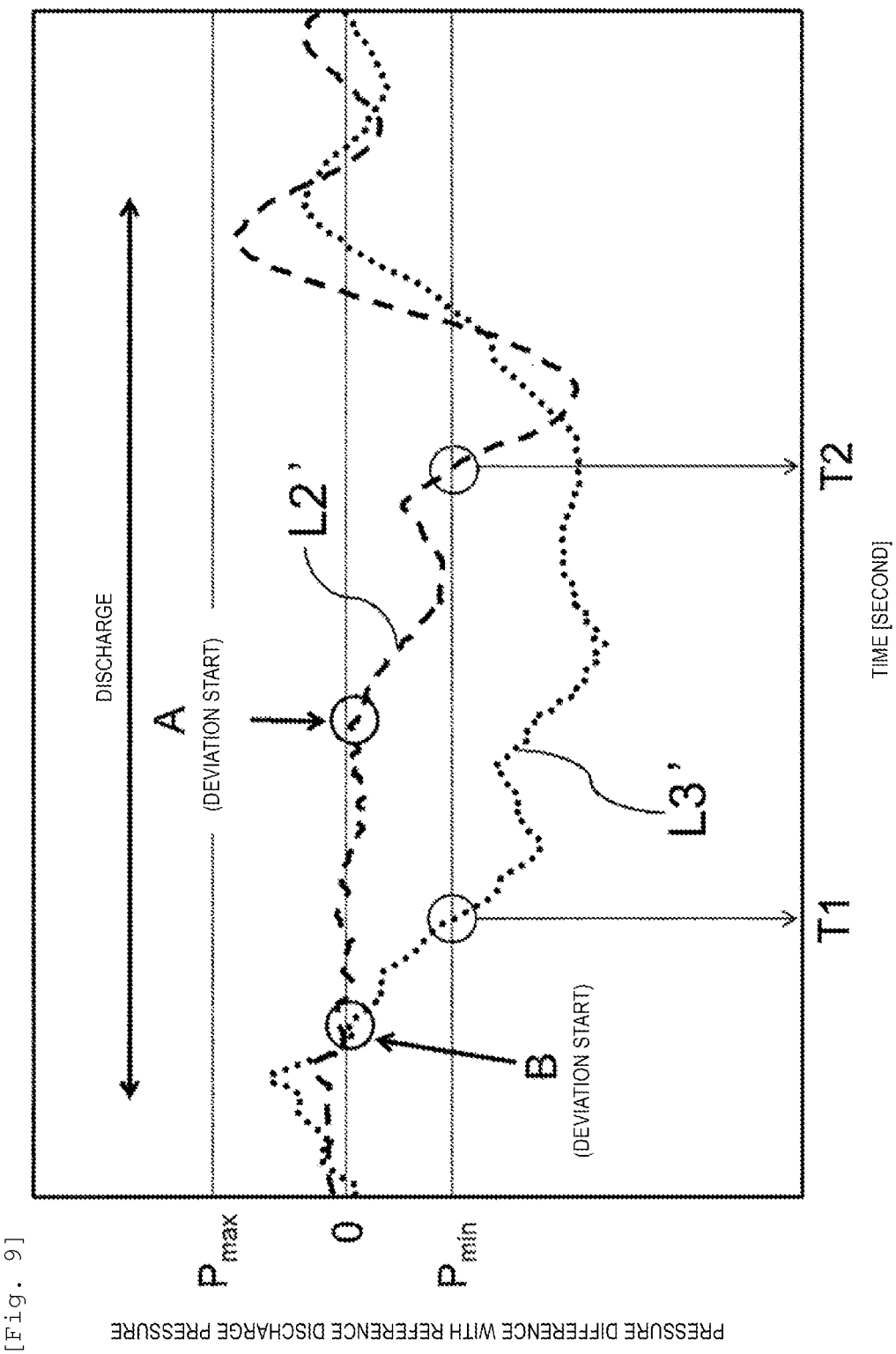
[Fig. 9]

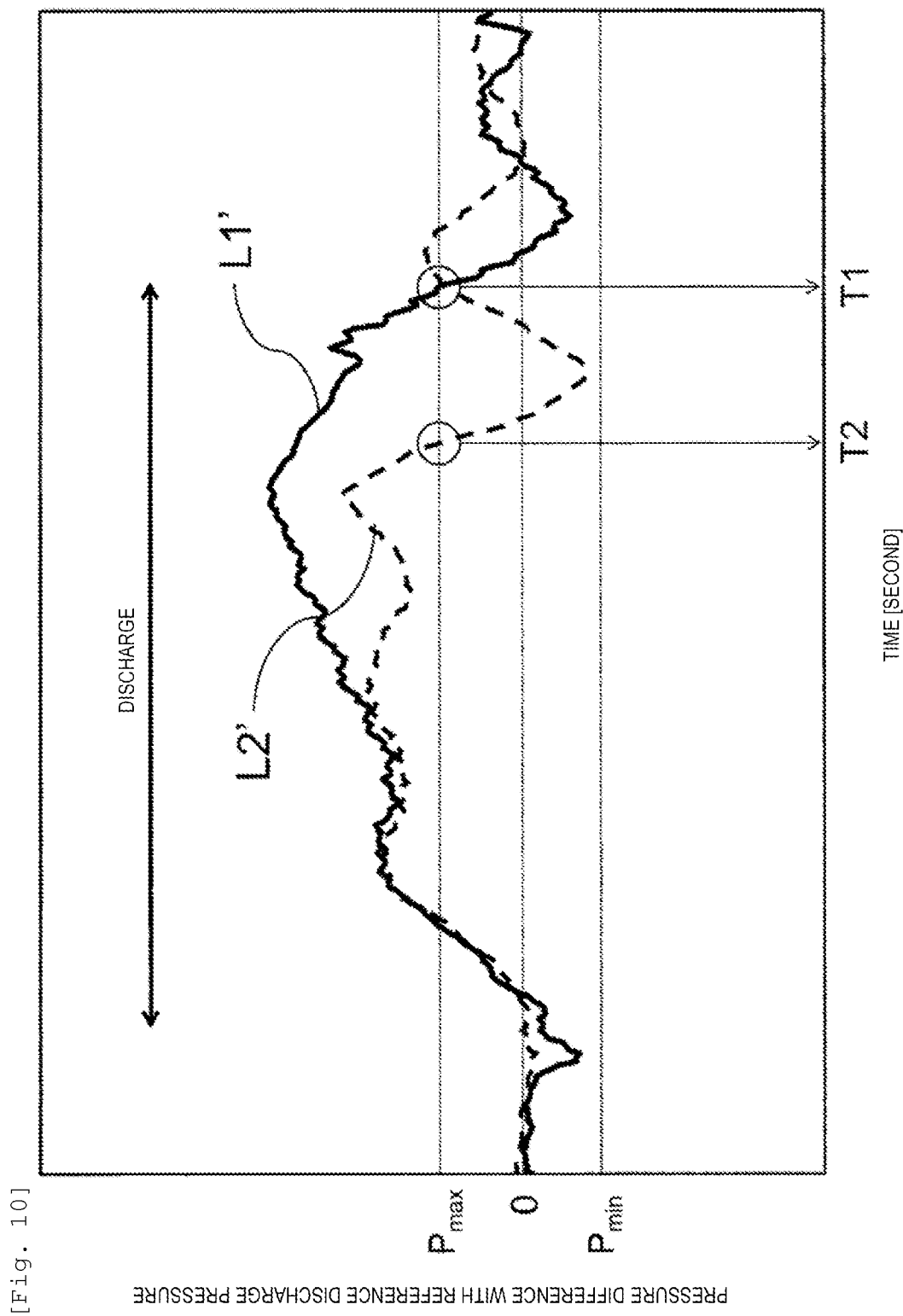
[Fig. 10]

[Fig. 11]

| No. | TIMING OF REFERENCE DISCHARGE PRESSURE ACQUISITION |
|---|---|
| 1 | DEVICE SHIPMENT (AT THE TIME OF PERFORMING SHIPMENT TEST) |
| 2 | DEVICE INSTALLATION (AT THE TIME OF PERFORMING APPARATUS PERFORMANCE VERIFICATION TEST) |
| 3 | ASSAY CALIBRATION |
| 4 | ACCURACY MANAGEMENT MEASUREMENT |
| 5 | PREPARATION OPERATION BEFORE ANALYSIS START |
| 6 | PROCESS BEFORE AND AFTER SAMPLE DISPENSING |

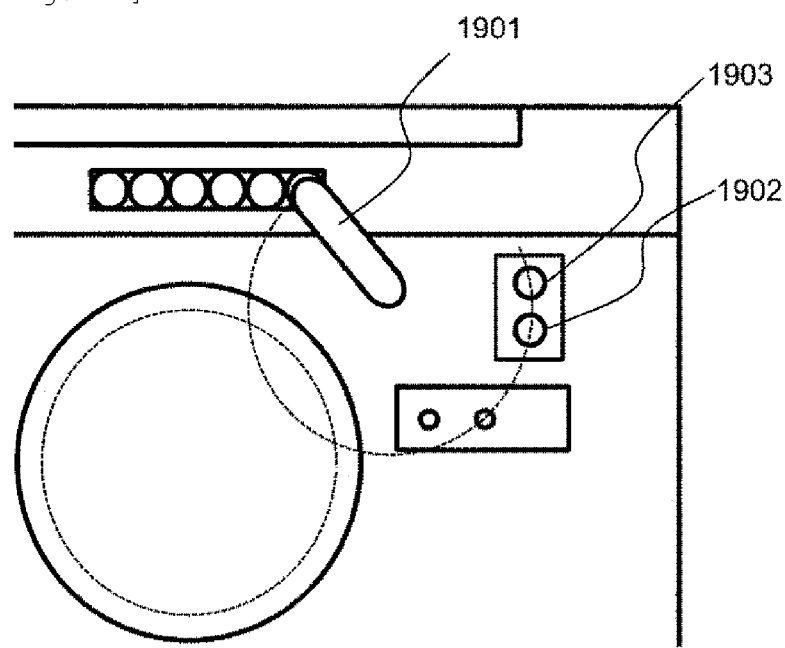
[Fig. 12]

AUTOMATIC ANALYSIS DEVICE

TECHNICAL FIELD

The present invention relates to an automatic analysis device with a sample dispensing unit for sucking and discharging a sample such as blood or urine and more particularly to an automatic analysis device with a function to detect bubbles which get mixed in a probe at the time of suction of a liquid.

BACKGROUND ART

Automatic analysis devices such as biochemical automatic analysis devices and immunological automatic analysis devices include a sample dispensing unit which dispenses some of the sample collected from a patient such as blood serum or plasma into a container as a specimen, and a reagent dispensing unit which sucks some of the reagent required for analysis of the sample and discharges it into the container.

Generally, a sample dispensing unit or reagent dispensing probe includes a probe, a syringe connected to it, and a mechanism to move the probe to a specified position, in which with the front edge of the probe inserted into a liquid, the syringe is driven to suck a specified amount of liquid into the probe. Then, the probe is moved to above a container and the syringe is driven to discharge the sucked liquid. In some cases, a disposable tip is attached to the probe front edge to suck and discharge the liquid.

On the other hand, during handling of the liquid, bubbles may get mixed in accidentally. In such circumstances, if bubbles are sucked together with the liquid at the time of suction of the liquid and the specified amount of liquid cannot be sucked, an analysis error will occur, which will require retesting and result in a decline in analysis throughput or loss in the sample and reagent.

As a means to solve this problem, for example, Patent Literature 1 employs a structure to detect a sample dispensing abnormality in which, regarding the pressure change at the time of discharge of a sample, the pressure integrated value in a specific zone and the average pressure difference between the time of steady discharge and the time of end of discharge are taken as indices and these are compared with a preset threshold.

CITATION LIST

Patent Literature

Patent Literature 1: Japanese Unexamined Patent Application Publication (Translation of PCT Application)

SUMMARY OF INVENTION

Technical Problem

The method described in Patent Literature 1, which focuses on the integrated value of pressures or the pressure change rate at the time of sample discharge in a specific zone in the dispensing flow path has a problem that whereas an abnormality can be detected when a relatively large difference in pressure waveform is found, an abnormality cannot be detected when the sample dispensing amount is small and no significant difference in pressure waveform is found between a normal case and an abnormal case.

The present invention has been made in view of the above problem and has an object to provide an automatic analysis device which can detect a dispensing abnormality with high sensitivity regardless of the degree of abnormality even when the liquid dispensing amount is small.

Solution to Problem

In order to solve the above problem, the device is structured as follows.

The device includes: a probe that performs a dispensing operation including a suction process and a discharge process with respect to a liquid; a syringe that generates a pressure change for dispensing the liquid at the probe; a flow path that connects the probe and the syringe with each other; a pressure sensor that measures the pressure change in the flow path at the time of liquid dispensing; a storage portion that stores a time-series pressure change when a reference fluid is discharged, as a reference discharge pressure waveform; and a determination portion that determines whether or not there is an abnormality in the suction process of the sample from a relationship between a value of difference or a ratio between the reference discharge pressure waveform and the pressure waveform of a liquid as a determination target at the time of discharge of the liquid, and a normal range.

Advantageous Effects of Invention

According to the present invention, an abnormality such as suction of bubbles can be detected regardless of the degree of abnormality even when the sample dispensing amount is small and no significant difference is found between a normal waveform and an abnormal waveform, and thus the reliability of the automatic analysis device with a sample dispensing unit can be enhanced.

BRIEF DESCRIPTION OF DRAWINGS

FIG. 1 is a schematic configuration view illustrating an automatic analysis device relating to the present invention.

FIG. 2 is a schematic configuration view illustrating a sample dispensing unit of the automatic analysis device relating to the present invention.

FIG. 3 is a diagram illustrating a pressure change in a dispensing flow path at the time of suction and discharge of liquid.

FIG. 4 is a view illustrating states of fluid movement in a tip when liquid sample and bubble are sucked and discharged.

FIG. 5 is a diagram illustrating a processing flow of dispensing abnormality detection in a case where a liquid sample is used as a reference fluid.

FIG. 6 is a diagram illustrating a processing flow of dispensing abnormality detection in a case where the air is used as a reference fluid.

FIG. 7 is a diagram illustrating a correlation between a timing at which the discharge pressure at the time of bubble suction deviates from a reference discharge pressure and a ratio of a bubble suction amount.

FIG. 8 is a diagram illustrating time-series data of a pressure in the flow path at the time of liquid discharge.

FIG. 9 is a diagram illustrating a result of converting time-series data of pressure in a flow path at the time of liquid discharge into time-series data of a pressure difference with a reference discharge pressure waveform (using a liquid sample as a reference fluid).

FIG. 10 is a diagram illustrating a result of converting the time-series data of the pressure in the flow path at the time of liquid discharge into time-series data of a pressure difference with a reference discharge pressure waveform (using air as a reference fluid).

FIG. 11 is a diagram illustrating timing suitable for measurement of a reference discharge pressure.

FIG. 12 is a view illustrating a disposition of a container accommodating a reference liquid.

DESCRIPTION OF EMBODIMENTS

Next, an embodiment of the present invention will be described referring to drawings.

FIG. 1 is a schematic configuration view illustrating an automatic analysis device 101 to which the dispensing abnormality detection technique according to this embodiment is applied.

In FIG. 1, the automatic analysis device 101 includes: a rack transport line 103 for transporting a rack 102, reagent cooling unit 104, incubator disc (reaction disc) 105, sample dispensing mechanism 106, reagent dispensing mechanism 107, consumable transport unit 108, and detection portion unit 109. These components are sometimes called units.

The rack 102 houses a plurality of sample containers 110 containing a biological sample (sample) such as blood or urine and it is transported on the rack transport line 103 with sample containers 110 housed in it.

The reagent cooling unit 104 is a reagent container storing portion which houses and refrigerates a plurality of reagent containers 111 containing various reagents to be used for analysis of a sample. At least a portion of an upper surface of the reagent cooling unit 104 is covered by a reagent disc cover 112.

The incubator disc 105 includes a reaction container disposition portion 114 in which a plurality of reaction containers 113 for reaction between the sample and reagent are disposed, and a temperature regulating mechanism for regulating the temperature of a reaction container 113 to a desired temperature.

The sample dispensing mechanism 106 has a rotary drive mechanism and a vertical drive mechanism and can dispense the sample into a reaction container 113 housed in the incubator disc 105 from a sample container 110 through these drive mechanisms. The reagent dispensing mechanism 107 also has a rotary drive mechanism and a vertical drive mechanism and dispenses a reagent in a reaction container 113 housed in the incubator disc 105 from a reagent container 111 through these drive mechanisms. The detection portion unit 109 includes a photomultiplier, light source lamp, spectroscope, and photodiode and has the function to regulate their temperatures, and analyzes the reaction liquid.

The consumable transport unit 108 includes: a storage container holding portion 117 which holds a consumable storage container 116 housing a plurality of consumables for use in sample analysis, such as reaction containers and dispensing tips; a preliminary storage portion 118 which temporarily holds these consumables; and a transport mechanism 119 which grasps and transports consumables. It has the function to transport a reaction container 113 or dispensing tip 115 on the consumable storage container 116 and the preliminary storage portion 118 to a specified position through the transport mechanism 119.

The consumable storage container 116, also called the magazine, has a plurality of concaves or holes in the top surface and is supplied to the operator with one consumable in each of the concaves or holes. These consumables are disposable, so the operator must supply a consumable storage container 116 to the automatic analysis device periodically and remove an empty consumable storage container 116 with all consumables consumed, from the device.

The transport mechanism 119 can move on rails located in an X axis, Y axis, and Z axis (not shown) to transport the reaction container 113 housed in the consumable storage container 116 or preliminary storage portion 118 to the incubator disc 105 or transport the dispensing tip 115 to a tip mounting position 120. Also, it discards a used reaction container 118 on the incubator disc 105 into a discarding hole 121. Furthermore, the transport mechanism 119 transports an unused reaction container 113 or dispensing tip 115 on the consumable storage container 116 to the preliminary storage portion 110 or transports a reaction container 113 and dispensing tip 115 on the preliminary storage portion 110 to the incubator disc 107 and the tip mounting position 120, respectively. Therefore, the transport mechanism 119 has an arm structure to grasp a reaction container or dispensing tip.

The preliminary storage portion 118 holds the reaction container 113 and dispensing tip 115 in the same manner as the consumable storage container 116. The transport mechanism 119 can place the reaction container 113 and dispensing tip 115 in the preliminary storage portion 118 and transport the reaction container 113 and dispensing tip 115 held on the preliminary storage portion 118 to the incubator disc 105 and the tip supply position 120.

The storage container holding portion 117 can be drawn out in the front, back or lateral direction of the device independently from the other mechanical portions so that the user can replace the consumable storage container 116 without access of the other mechanisms to the consumable storage container 116. The storage container holding portion 117 may have a door or cover which allows the operator to access by opening and closing the door or cover. Also, the storage container holding portion 117 has a lock mechanism so that the lock mechanism can prevent it from being drawn out while a mechanism such as the transport mechanism 119 is accessing the consumable storage container 116. Furthermore, the storage container holding portion 117 has a sensor to detect whether the consumable storage container 116 has been installed, so that when the storage container holding portion 117 is drawn out, whether the consumable storage container 116 has been replaced can be detected.

In the automatic analysis device 101, the abovementioned rack transport line 102, reagent container disc 104, incubator disc 105, sample dispensing mechanism 106, reagent dispensing mechanism 107, consumable transport unit 108, detection portion unit 109 and so on are called analysis operation portions.

In addition to the above analysis operation portions, the automatic analysis device 101 includes a control device (control portion) 122 which controls the operation of the entire automatic analysis device 101, and an operation portion 123. The control portion 122 is, for example, a hardware board which is connected to a control device 124 such as a computer, and a storage device 125 such as a hard disk. The operation portion 123 includes a display portion such as a display unit and input devices such as a mouse and keyboard. The storage device 125 stores, for example, a temperature range for each unit. The control portion 122 or control device 124 may be structured as hardware in the form of a special circuit board or as software to be executed by a computer connected to the automatic analysis device 101. If it is to be structured as hardware, it can be implemented by integrating a plurality of arithmetic units for performing processing, on a wiring board or in a semiconductor chip or a package. If it is to be structured as software, it can be implemented by mounting a high-speed general-purpose CPU on a computer and executing a program to perform the desired arithmetic processing. The existing device can be upgraded by a recording medium which stores the program. In addition, the device, circuit, and computer are connected by a wired or wireless network so that data is received and transmitted as appropriate.

<Sample Dispensing Unit>

FIG. 2 is a schematic configuration view of a sample dispensing unit according to the present invention.

A sample probe 202 to which a freely attachable/detachable tip 201 is attached is connected through a flow path 203 to a syringe 204 and their inner spaces are filled with a liquid. The syringe 204 includes a cylinder 204a and a plunger 204b and a syringe driving means 205 is connected to the plunger 204b. The syringe driving means 205 moves the plunger 204b up and down with respect to the cylinder 204a to suck or discharge the sample. The sample probe 202 is connected to a motor as a sample probe driving means 206, which can move the sample probe 202 horizontally and horizontally to place it in a prescribed position. The syringe driving means 205 and sample probe driving means 206 are controlled by the control portion 207.

When the sample 209 in the container 208 is sucked, air (segmenting air) is taken into the tip 201 prior to sucking operation in order to prevent the liquid filled in the sample probe 202 from being mixed with the sample 209. Then, the sample probe 202 is moved down by the sample probe driving means 206 until the front edge of the tip 201 arrives into the sample 209 liquid, and sucking operation is further performed. When the sample sucking operation is ended, the sample probe 202 moves to a sample discharge position and the syringe 204 performs discharge operation.

After discharging, the sample probe 202 can be cleaned by ejecting the wash water 212 in a water supply tank 211 at high pressure, using a water supply pump 210. The flow path to the water supply tank is opened and closed by an electromagnetic valve 213. The electromagnetic valve 213 is controlled by the control portion 207.

The pressure sensor 214 for measuring the pressure in the flow path 203 is connected through a branch block 215 to a flow path line including the sample probe 202, flow path 203 and syringe 204. Here, in order to measure the pressure change in the sample probe 202 and tip 201 opening with high sensitivity, it is desirable that the pressure sensor 214 be located as near to the sample probe 202 as possible. The output value of the pressure sensor 214 is amplified by a signal amplifier 216 and converted into a digital signal by an A/D converter 217. The converted digital signal is sent to a determination portion 218 to determine whether the sample has been normally sucked by the method described below.

<Pressure Waveform in the Sample Dispensing Unit>

FIG. 3 shows pressure waveforms obtained by dispensing a liquid in the sample dispensing unit with a pressure sensor in which the dispensing amount is set at 30 μL. The horizontal axis represents time and the vertical axis represents a pressure sensor output value. Here, the liquid is not limited; it may be a sample, reagent or wash water.

FIGS. 3(a) and 3(b) show pressure waveforms at the time of suction and discharge of the liquid, respectively. Solid line L1 represents a discharge pressure when the sample is normally sucked or discharged, and broken lines L2 and L3 represent a discharge pressure when bubbles are sucked together with the liquid. Broken line L2 represents a case that the amount of sucked bubbles is almost a half of the set suction amount, and broken line L3 represents a case where the ratio of sucked bubbles is almost 90%.

As apparent from the figures, in the pressures at the time of suction, the waveform difference between the normal case and abnormal case is not so apparent compared with the pressures at the time of discharge. In other words, regarding the pressure waveforms at the time of suction, the waveform in the case where the amount of sucked bubbles is almost a half (broken line L2) virtually overlaps the normal waveform (solid line L1) and it is only in the case where the ratio of sucked bubbles is almost 90% (broken line L3) that a certain deviation from the normal case occurs.

On the other hand, in the pressures at the time of discharge, a significant deviation in waveform is seen between the normal case and abnormal case. Although the normal waveform and abnormal waveform overlap just after the start of discharge, a deviation between them begins at a certain timing (arrow A in FIG. 3(b)). Then, they overlap again just before the end of discharge (arrow B in FIG. 3(b)). The timing when the deviation begins depends on the amount of sucked bubbles. This is because the deviation begins at the timing of transition from the liquid discharge process to the bubble discharge process. FIGS. 4(a) and 4(b) show fluid movement in a tip 403 when bubbles 402 are sucked or discharged together with a liquid sample 401, respectively. As shown in FIG. 4(a), the liquid sample 401 is first sucked and as the liquid level goes down, suction of bubbles begins at the timing when the tip edge leaves the liquid surface. The bubbles 402 which have mixed into the tip 403 come to float on the surface of the sucked liquid sample 401. When discharge is started in this state, the liquid sample 401 is first discharged and then the bubbles 402 are discharged (FIG. 4(b)). The above deviation begins at the timing when the liquid discharge process is switched to the bubble discharge process. Therefore, if the amount of sucked bubbles is large and the amount of sucked liquid is small, switching from liquid discharge to bubble discharge occurs earlier. This means that how much bubbles 402 have been sucked can be determined by paying attention to the timing when the deviation begins.

According to the present invention, in the conventional method described in Patent Literature 1 (method which pays attention to the integrated pressure value in a specific zone), a normal case and an abnormal case cannot be distinguished unless the zone for integration is set appropriately. For example, if the zone for integration is set at an earlier stage just after the start of discharge, the abnormality can be detected in the case where the ratio of sucked bubbles is almost 90% (broken line L3) but the abnormality cannot be detected in the case where the amount of sucked bubbles is almost a half (broken line L2). On the other hand, according to the method in this embodiment, bubbles and even the amount of sucked bubbles can be detected with high accuracy in a simple manner.

<Dispensing Abnormality Detection Algorithm (in the Case of the Reference Pressure Waveform Taken from a Liquid)>

Next, the processing flow of dispensing abnormality detection according to the present invention will be described. FIG. 5 shows a determination algorithm in a case where the pressure waveform in discharge of a reference liquid is taken as a reference pressure waveform.

In the present invention, an abnormality at the time of liquid suction is detected using the pressure in the dispensing flow path at the time of sample discharge. First, the liquid is sucked into the sample probe (S51). Then, at the same time when the probe 202 discharges the liquid 209, the sampling portion 219 collects output values from the pressure sensor 214 in a time-series manner (S52). The collected pressure data is converted into time-series data of pressure difference or pressure ratio with the reference discharge pressure waveform (S53). Here, it is assumed that the reference discharge pressure waveform is previously defined for each set dispensing amount and stored in the storage portion 202.

The comparison portion 221 serially monitors whether the pressure difference or pressure ratio with the reference discharge pressure waveform is not out of the normal range (S54, S55). If in the period until the end of discharge, there is no deviation from the normal range, the sample suction concerned is determined as normal (S56). On the other hand, if deviation from the normal range occurs at least once, the sample suction is determined as abnormal (S57). Here, it is assumed that the normal range to which reference is made for determination is previously defined for each set dispensing amount and stored in the storage portion 220. In the present invention, even if deviation from the normal range occurs only once, it is determined as abnormal suction; however, alternatively, the suction may be determined as abnormal only when deviation occurs two or more times consecutively or the suction may be determined as abnormal only when deviation occurs two or more times in a given time period.

Furthermore, the comparison portion 221 can estimate the degree of abnormality at the time of liquid suction, namely how much bubbles have been mixed, according to the timing when the pressure difference or pressure ratio with the reference discharge pressure waveform deviates from the normal range. This estimation uses a correlation curve which represents the correlation between timing of deviation from the normal range (timing of abnormality detection) and the degree of abnormality. This correlation curve should be previously defined for each set dispensing amount and stored in the storage portion 220.

Furthermore, the comparison portion 221 may estimate the cause of abnormality according to the estimated degree of abnormality. For example, if suction is determined as a complete empty suction (no liquid is sucked), the cause is estimated to be not bubbles on the liquid surface but an abnormality in the dispensing system such as a syringe failure or clogging of the sample probe.

<Dispensing Abnormality Detection Algorithm (in the Case of the Reference Pressure Waveform Taken from Air)>

FIG. 6 shows a processing flow of dispensing abnormality detection in the case where air is used as a reference fluid. The process (S61 to S63) until the discharge pressure waveform at the time of dispensing of the liquid as the determination target is converted into a pressure difference or pressure ratio with the reference discharge pressure waveform is the same as in the flowchart of FIG. 5, so description thereof is omitted here.

Here, since the air discharge pressure at the time of empty suction is taken as the reference discharge pressure waveform, if the pressure waveform at the time of discharge of the liquid as the determination target completely coincides with the reference pressure waveform, the suction of the liquid as the determination target is determined as empty suction. In other words, the comparison portion 221 sequentially monitors the pressure difference or pressure ratio with the reference pressure waveform and if they have never deviated from a given determination range which considers reference pressure fluctuations, the sample suction concerned is determined as empty suction (S66). Conversely, a range other than the above "given determination range" can be a "normal range" and it can be said that if deviation from the normal range continues during the discharge process, the suction is determined as empty suction.

On the other hand, after deviation from the determination range (namely, from the state in which there is no deviation from the "normal range"), if the pressure difference or ratio again falls within the determination range at the same time as completion of discharge operation of the syringe 204, the sample suction concerned is determined as normal (S68). If neither of the above conditions occurs, it is determined that some bubbles have been mixed (S69). Here, the reference pressure waveform and the determination range to which reference is made for determination should be previously defined for each set dispensing amount and stored in the storage portion 220.

Furthermore, the comparison portion 221 may estimate the degree of abnormality according to the timing from when the pressure difference or ratio between the pressure waveform at the time of discharge of the liquid as the determination target and the reference pressure waveform once deviates from the determination range until it again falls within the determination range. In this case, the degree of abnormality can suggest how much air has been mixed in the pipette at the time of liquid suction.

Furthermore, the cause of abnormality may be estimated according to the estimated degree of abnormality. This estimation uses a correlation curve which represents the relationship between the time period after deviation from the above range until falling within the range and the degree of abnormality. This correlation curve should be previously defined for each set dispensing amount and stored in the storage portion 220.

As explained above, an abnormality in sample suction can be detected regardless of whether a liquid or air is used as a reference fluid.

<Method for Generating a Reference Pressure Waveform>

Next, the method for acquiring a reference discharge pressure waveform, the method for setting a pressure range to which reference is made for determination of normality or abnormality, and the method for generating a correlation curve will be described in detail.

The reference discharge pressure waveform is a discharge pressure which is acquired when a reference fluid is normally sucked or discharged. The reference fluid is a fluid whose viscosity is within the viscosity range of the sample to be handled by the automatic analysis device and which does not contain a solid foreign substance or the like. For example, in the case of an automatic analysis device, it is a liquid sample which has a viscosity equivalent to the viscosity of human serum and does not contain clots or the like. A sample which meets this requirement may be control serum or purified water. As mentioned above, the reference fluid is not limited to a liquid but it may be air which may be used for empty suction. In the case of empty suction, it is unnecessary to prepare a reference fluid and the burden of the acquisition of the reference discharge pressure waveform can be reduced.

On the other hand, normal suction/discharge means that dispensing operation is completed under a condition that there are no bubbles on the liquid surface, without an abnormality such as clogging of the sample probe. Here, it is assumed that variations in the components of the sample dispensing unit, including variation in the sample probe inside diameter and variation in pressure sensor sensitivity, are within a specified allowable range.

After the above conditions are met, the discharge pressure waveform of the reference fluid is measured a plurality of times and the average waveform is defined as the reference discharge pressure waveform. Here, the accuracy in determination of normality or abnormality can be improved by making measurements as many times as possible to define the reference discharge pressure waveform. Details about acquisition of the reference discharge pressure waveform will be described later.

The pressure range to which reference is made for determination of normality or abnormality is defined according to variation in the reference discharge pressure waveform. Here, when the above range is set to be narrower, the sensitivity of abnormality detection will be higher but the probability of detection error will be higher. Therefore, it is important to balance these aspects adequately to set the above range.

The timing of abnormality detection (timing when it is determined that bubbles have been mixed) and the degree of abnormality have a certain correlation. FIG. 7 shows an example of the correlation curve. When a correlation curve concerning the timing of abnormality detection and the degree of abnormality is preset, if an abnormality actually occurs, the degree of abnormality can be estimated from the timing of occurrence of the abnormality. Here, the accuracy of estimation can be improved by making measurements as many times as possible to define the correlation curve accurately.

The reference discharge pressure waveform, normal range, and correlation curve which are acquired by the above methods must be preset for all the set dispensing amounts that are applied in the automatic analysis device in use. The reason is that the conditions to drive the dispensing syringe and the sample probe are different for each dispensing amount and the discharge pressure waveform also changes accordingly. However, for an ordinary automatic analysis device, the minimum and maximum dispensing amounts and the dispensing resolution are predetermined according to the specification and the types of dispensing amounts are limited, and thus what is needed is only to preset as many sets of reference discharge pressure waveform, normal range, and correlation curve as the types of dispensing amounts.

Next, what has been so far mentioned about the abnormality detecting means in the present invention will be explained by showing the actually acquired pressure waveforms.

<Time-Series Pressure Data>

FIG. 8 shows an example of time-series data of pressure in the flow path which is collected by the pressure sensor 214 at the time of discharge of the liquid as the determination target.

The horizontal axis represents time and the vertical axis represents a pressure sensor output value. Solid line L1 represents a pressure in the flow path at the time of discharge (reference discharge pressure waveform) in the case where the liquid as the reference fluid is normally dispensed. On the other hand, broken lines L2 and L3 represent a pressure in the flow path at the time of discharge in the case where bubbles are sucked together with the liquid. Broken line L2 represents a case where bubbles equivalent to almost a half of the set suction amount have been sucked and L3 represents a case where bubbles equivalent to almost 90% of the set amount have been sucked. As shown in FIG. 8, when bubbles are sucked at the time of suction, the pressure in the flow path suddenly declines at a certain timing in the sample discharge zone and deviation from the reference discharge pressure waveform begins (arrows A and B in the figure). This deviation from the reference discharge pressure waveform can be directly expressed by converting the pressure in the flow path at the time of liquid discharge into a pressure difference from the reference discharge pressure waveform.

<Time-Series Data of Pressure Difference>

FIG. 9 shows the result of converting the pressure in the flow path at the time of liquid discharge (curves L2 and L3 in FIG. 8) into a pressure difference from the reference discharge pressure waveform (curve L1 in FIG. 8).

The values after conversion are expressed by broken lines L2' and L3' respectively. The horizontal axis represents time and the vertical axis represents a pressure value relative to the reference discharge pressure waveform, in which if the pressure in the flow path at the time of discharge is higher than the reference discharge pressure waveform, the value is positive, and if it is lower, the value is negative. If the relative pressure gets out of the normal range once at a certain timing in the liquid discharge zone, the suction is determined as abnormal. In FIG. 9, the minimum value and maximum value of the normal range are expressed by Pmin and Pmax, respectively. As mentioned above, for the purpose of preventing detection errors, it is desirable to set the normal range as wide as possible, in consideration of variation in the reference discharge pressure waveform.

Broken lines L2' and L3' get out of the normal range at timings T1 and T2, respectively. Therefore, in both the cases, it is determined that an abnormality (suction of bubbles) has occurred in the liquid suction. Furthermore, by using the correlation curve representing the correlation between the above timing and the amount of sucked bubbles, which is previously defined for each set dispensing amount, the degree of abnormality (amount of sucked bubbles) can be estimated to some extent from the timing (T1, T2) when the abnormality has been detected.

Next, FIG. 10 shows time-series data of pressure difference between the pressure in the flow path at the time liquid discharge (solid line L1 and broken line L2 in FIG. 8) and the reference discharge pressure waveform, in the case where air is taken as a reference fluid.

The curves after conversion are expressed by solid line L1' and broken line L2', respectively. The horizontal axis represents time and the vertical axis represents a relative pressure value with respect to the reference discharge pressure waveform. If the pressure in the flow path at the time of discharge is higher than the reference discharge pressure waveform, the value is positive, and if it is lower, the value is negative. Here, if the relative pressure has never deviated from a set range in the sample discharge zone, the suction is determined as empty suction. On the other hand, if, after getting out of the set range, it again falls within the above range at the same time as completion of discharge operation of the syringe, the sample suction concerned is determined as normal. If neither of the above conditions occurs, it is determined that some bubbles have been mixed. In FIG. 10, the minimum value and maximum value of the set range are expressed by Pmin and Pmax, respectively. As mentioned above, for the purpose of preventing detection errors, it is desirable to set the set range as wide as possible, in consideration of variation in the reference discharge pressure waveform.

After getting out of the set range, solid line L1' and broken line L2' again fall within the set range at timings T1 and T2, respectively. Here, since T1 is the same as timing of completion of discharge operation of the syringe, it is determined that solid line L1' indicates that liquid suction has been performed normally. On the other hand, broken line L2' falls within the set range at an earlier timing than completion of discharge operation, so it is determined that an abnormality (suction of bubbles) has occurred at the time of liquid suction.

Furthermore, when a correlation curve representing the correlation between the time period until falling again within the set range and the amount of sucked bubbles is stored previously for each set dispensing amount, the degree of abnormality (amount of sucked bubbles) can be estimated to some extent from timing (T2) when an abnormality in sample suction has been detected.

FIG. 11 shows timings to acquire a reference pressure waveform effective to remove influential factors for pressure waveforms. The timings shown in FIG. 11 are just examples and the acquisition need not be always performed at the timings listed herein and if the influence given by the influential factors is small, the acquisition is unnecessary.

The factors which may influence pressure waveforms include: (1) hardware individual specificity; (2) change in the environment of the device installation site, such as the atmospheric pressure; and (3) difference in the date of inspection.

First, the influence of hardware individual specificity can be resolved by letting each device have a reference discharge pressure waveform, so the reference discharge pressure waveform should be acquired at the time of shipment of the device. The reference fluid to be used may be purified water or air (empty suction).

The influence of change in the environment of the device installation site, such as the atmospheric pressure, can be resolved by acquiring the reference discharge pressure waveform at the time of installation of the device in a test room. This has an additional advantage that the influence of hardware individual specificity can also be resolved. Here, the reference fluid may be purified water or air (empty suction).

In order to resolve the influence of difference in the date of test, the pressure should be acquired at the time of performance of assay calibration. Here, assay calibration refers to a process to periodically correct the calibration curve to be used in converting the measurement signal obtained in the analyzing section of the device into the concentration of the measurement target, and assay calibration is performed for all test items. In this case, the reference fluid is a calibrator. The acquisition of the reference discharge pressure waveform in this process offers a plurality of advantages. The first advantage is that since assay calibration is performed relatively frequently, the reference discharge pressure waveform can be acquired at regular intervals. The frequency differs depending on the test room and for example, assay calibration is performed monthly. The second advantage is that since this process is performed in the course of daily operation of the device, the user of the device need not do any special work to acquire the reference discharge pressure waveform. In addition, since assay calibration is performed for all test items as mentioned above, it has an advantage that the reference discharge pressure waveforms suitable for all dispensing amounts that are applied to the device can be acquired. Another outstanding advantage is that since generally the sample used in assay calibration has a viscosity suitable for the device, it is highly suitable as a reference fluid.

Instead of assay calibration, the acquisition of the reference discharge pressure waveform at the time of accuracy management measurement can also resolve the influence of difference in the date of test. The frequency differs depending on the test room and the acquisition is performed, for example, daily, so the reference discharge pressure waveform may be acquired at regular intervals. In addition, like assay calibration, this process is performed in the course of daily operation of the device, so the user of the device need not do any special work. In this case, the reference fluid is an accuracy management sample.

In addition, the reference discharge pressure waveform can be measured in the process of preparation operation before start of analysis or in the process before and after sample dispensing. By adopting this approach, all the factors described so far can be removed. The reference fluid may be purified water or air (empty suction).

FIG. 12 is a view showing a vicinity of a dispensing probe in which a liquid sample such as purified water is used as a reference fluid and a container for accommodating the reference fluid is installed over a sample dispensing unit to perform dispensing from it as needed.

For example, one method is that a container 1902 for accommodating a reference fluid and a container 1903 as a destination to which the dispensed reference fluid is discharged are installed on the rotational orbit of a sample probe 1901. When dispensing the reference fluid such as purified water from the container 1902 in the process of preparation operation before start of analysis or in the process before or after sample dispensing, the reference discharge pressure waveform can be acquired. The container 1903 need not be always installed as the destination to which the reference fluid is discharged; for example, the fluid may be directly discharged into the container 1902.

According to the present invention, an abnormality caused by suction of bubbles at the time of liquid suction can be detected accurately by paying attention to the pressure difference or pressure ratio of pressure in the dispensing flow path at the time of liquid discharge with the reference discharge pressure waveform. Particularly, even when the amount of suction is very small, highly accurate detection can be made, so it is possible to prevent the operator from being notified of an abnormal measurement result due to dispensing abnormality.

The acquired waveform may be subjected to various known correction processes. For example, the correction processes include an offset error correction, peak rise timing error correction, smoothing process, and cycle/amplitude error correction. By performing these correction processes, the influences of hardware individual specificity and the surrounding environment such as the device installation environment, and the influence of sunlight, etc. can be removed so that whether there are bubbles or not can be detected accurately.

In the present invention, determination of abnormality at the time of sample suction has been explained as an example, but a liquid other than a sample may be the target. For example, the present invention can be applied to determination of abnormality at the time of suction of a reagent, buffer solution, diluting fluid, or cleaning liquid.

Furthermore, when a container for accommodating a reference fluid is installed on a probe movement route, by adequately selecting the timing to acquire the acquisition of the reference discharge pressure waveform, waveform variation due to various reasons can be suppressed and the detection performance in the present invention can be maximized.

REFERENCE SIGNS LIST

101 automatic analysis device
102 sample rack
103 rack transport line 104 reagent cooling unit
105 incubator disc
106 sample dispensing mechanism
107 reagent dispensing mechanism
108 consumable transport unit
109 detection portion unit
110 sample container
111 reagent container
112 reagent disc cover
113 reaction container
114 reaction container disposition portion
115 dispensing tip
116 consumable storage container
117 storage container holding portion
118 preliminary storage portion
119 transport mechanism
120 tip mounting position
121 discarding hole
122 control portion
123 operation portion
124 control device
125 storage device
201 tip
202 sample probe
203 flow path
204 syringe
204a cylinder
204b plunger
205 syringe driving means
206 sample probe driving means
207 control portion
208 container
209 sample
210 water supply pump
211 water supply tank
212 wash water
213 electromagnetic valve
214 pressure sensor
215 branch block
216 signal amplifier
217 A/D converter
218 determination portion
219 sampling portion
220 storage portion
221 comparison portion
401 liquid sample
402 bubble
403 tip

The invention claimed is:
1. An automatic analysis device, comprising:
a detector that analyzes a sample;
a probe that performs a dispensing operation including a suction process and a discharge process with respect to a liquid;
a syringe that generates a pressure change for dispensing the liquid at the probe;
a flow path that connects the probe and the syringe with each other;
a pressure sensor that measures the pressure change in the flow path at the time of dispensing the liquid;
a storage device configured to store a time-series pressure change when reference fluid is discharged as a reference discharge pressure waveform; and
a control device configured to determine whether or not there is an abnormality in the suction process of the sample from a relationship between
(1) a value of
 (a) a difference or
 (b) a ratio,
between
 (c) the reference discharge pressure waveform and
 (d) the pressure waveform at the time of discharge of the liquid and
(2) a value previously determined to be in a normal range,
wherein the storage device is configured to store a relationship between a time when the value first deviates from the value previously determined to be in the normal range and an amount of air mixed in the liquid for each preset dispensing amount, and
wherein the control device is configured to estimate the amount of air mixed in the liquid based on an amount of time from the time when the value first deviates from the value previously determined to be in the normal range until a time when the value returns to be within the value previously determined to be in the normal range.
2. The automatic analysis device according to claim 1, wherein the storage device stores the reference discharge pressure waveform and the normal range for each set dispensing amount.
3. The automatic analysis device according to claim 1, wherein the control device is configured to determine a cause of an abnormality based on an estimated amount of air contained in the sample.
4. The automatic analysis device according to claim 1, wherein the reference discharge pressure waveform is any of a pressure waveform obtained at the time of discharge of a calibrator which is measured at the time of performing assay calibration, a pressure waveform obtained at the time of discharge of an accuracy management sample which is measured at the time of accuracy management measurement performance, a pressure waveform obtained at the time of discharge of purified water, or a pressure waveform obtained at the time of discharge of air.
5. The automatic analysis device according to claim 1, wherein the reference discharge pressure waveform is acquired at any timing of at the time of shipping of the automatic analysis device, at the time of installation of the automatic analysis device, at the time of a preparation operation before analysis start, or before and after liquid is sucked and discharged.
6. The automatic analysis device according to claim 1, further comprising:
a container for accommodating purified water as the reference fluid on a movement path of the probe.

* * * * *